Feb. 16, 1954  P. B. SHAW  2,669,320
WATER SEPARATOR AND FILTER FOR AIR PRESSURE LINES
Filed Aug. 26, 1949  2 Sheets-Sheet 1
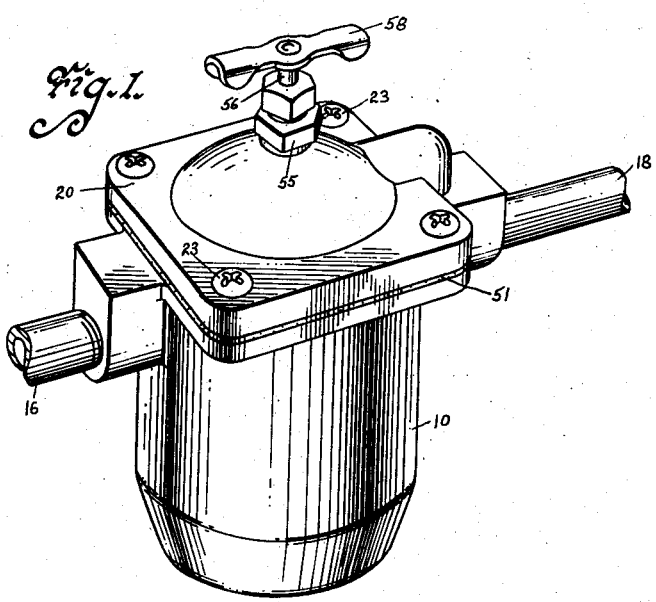
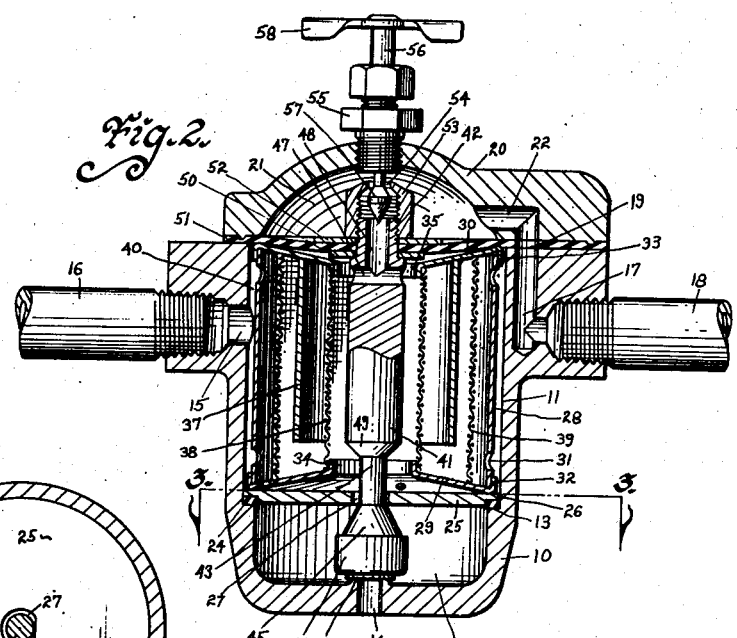
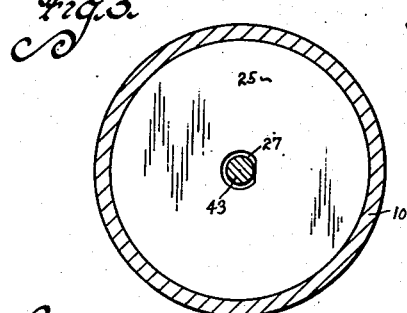
Inventor
Paul B. Shaw
by M. Talbert Dick
Attorney
Witness
Edward P. Seely

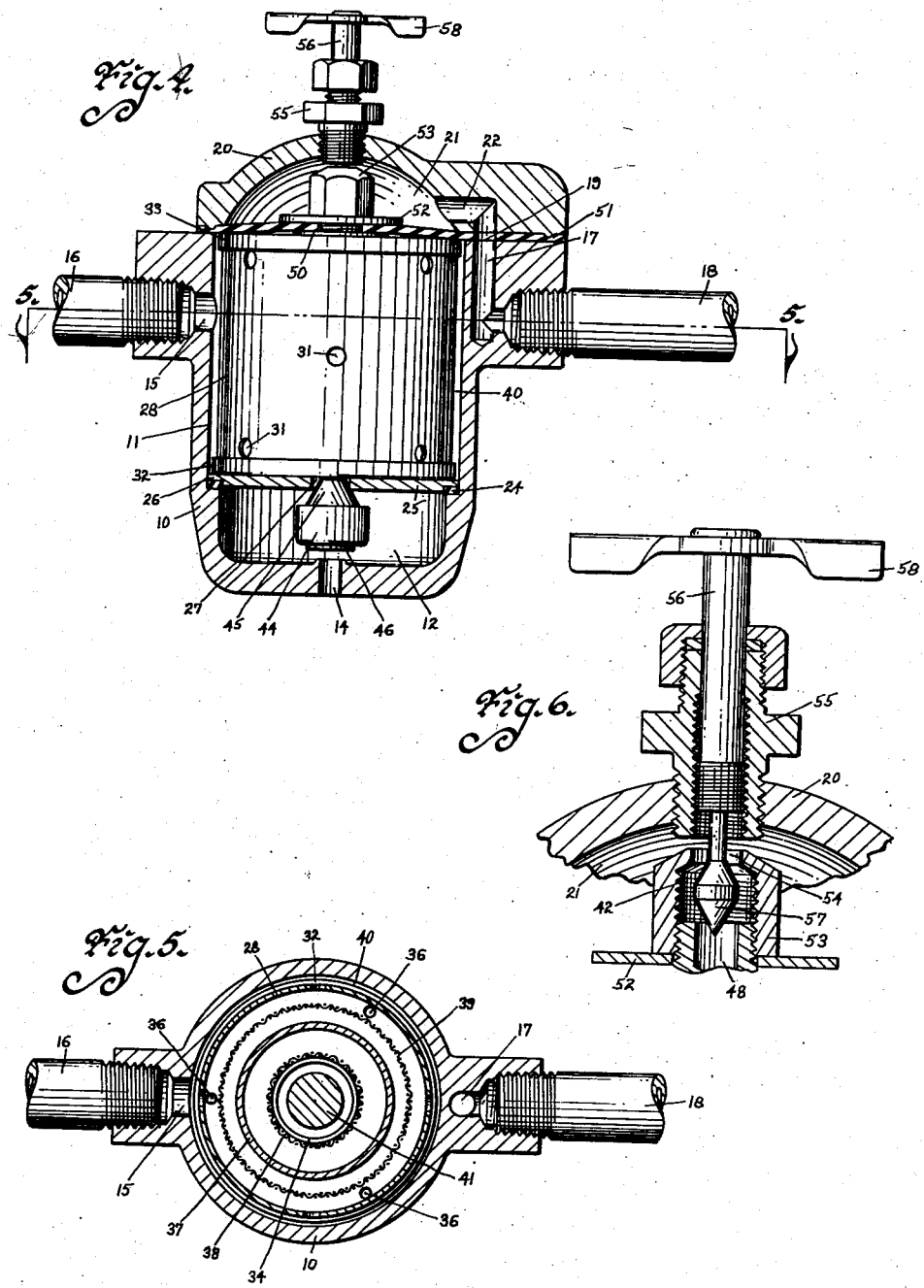

Patented Feb. 16, 1954

2,669,320

UNITED STATES PATENT OFFICE 2,669,320

WATER SEPARATOR AND FILTER FOR AIR PRESSURE LINES

Paul B. Shaw, Iowa City, Iowa

Application August 26, 1949, Serial No. 112,626

7 Claims. (Cl. 183—42)

My invention relates to a water separator and filter to remove moisture, grit, sludge, rust and the like from air under pressure and is designed for use in a pipe or hose line conducting air under pressure from a source of supply to a point of use.

Compressed air as a source of power has many uses today such as operating spark plug cleaners, paint spray guns, powered hand tools, grease guns and the like and in these uses it is highly essential that the air at the point of use be free of moisture, grit, sludge, rust or the like. It is well known that moisture will condense out of compressed air and the amount of condensation will vary in proportion to the distance the air must travel to the point of use, changes of temperature along the air line and other causes. Consequently, if moisture is permitted to be discharged with the air at the point of use, serious damage and inefficient results can and will frequently occur.

In overcoming these obstacles I have invented a device, the principal object of which is to provide a combination water separator and filter for drying and filtering compressed air in an air pressure line and automatically discharging the moisture therefrom and which device is capable of being adjusted for use with a variety of devices attached at times to the air line at the point of use and having a variation in the diameter of their respective outlet orifices.

A further object of this invention is to provide a combination water separator and filter through which air under pressure flows from a source of supply to a point of use and wherein any moisture, sludge, grit, rust or the like is filtered from the compressed air and automatically discharged from the air flow line at times.

A still further object of this device is to provide a combination water separator and filter through which air under pressure flows from a source of supply to a point of use and wherein any moisture, sludge or the like is filtered from the compressed air and collected in a trap from which point it is automatically discharged because of a difference of pressure existing in the inlet and outlet of the separator and filter resulting when the device at the point of use is started or stopped.

A still further object of this invention is to provide a combination water separator and filter through which air under pressure flows from a source of supply to a point of use and wherein any moisture, sludge or the like is filtered from the compressed air and collected in a trap from which point it is automatically discharged and which separator and filter is designed to permit a bleeding or slight leakage of the moisture from the tray to a collecting chamber during any prolonged operation of the device at the point of use and from which chamber it will not only drain by gravity during such prolonged operation but will be discharged by air pressure when the device at the point of use is started or stopped.

Still further objects of this invention are to provide a combination water separator and filter for drying and filtering compressed air in an air pressure line and automatically discharging the moisture therefrom which is economical in manufacture, simple in construction, easily and quickly installed, efficient in operation, easy and economical to repair, and designed for long usage.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a perspective view of this device ready for use,

Fig. 2 is a longitudinal sectional view of this device as shown in Fig. 1,

Fig. 3 is a cross-sectional view of this device taken on the line 3—3 of Fig. 2, Fig. 4 is a side view of this device with the outer housing cut away to more fully illustrate its construction, Fig. 5 is a cross-sectional view of this device taken on the line 5—5 of Fig. 4, and Fig. 6 is an enlarged longitudinal sectional view of the upper portion of this device.

Referring to the drawings, I have used the numeral 10 to designate a housing provided with the chamber 11 and a reduced chamber portion 12 below chamber 11 which results from the circumscribing ledge 13 that is machined in the lower inner portion of the housing 10, as shown in Fig. 2 and Fig. 4. The numeral 14 designates a centrally located opening provided in the bottom of the housing 10.

One side of the upper portion of the housing 10 is provided with the inlet 15 that is designed to communicate with a hose or pipe 16 conducting air under pressure from a source of supply. The other side of the housing 10, at a point substantially diametrically opposite to the inlet 15, is provided with the outlet 17 that is designed to communicate at one end with a hose or pipe or the like 18 conducting compressed air to a point of use and extends at its other end upwardly through the top of the housing 10 at the point 19 as shown in Fig. 2.

The numeral 20 designates a housing provided with the chamber 21 and the outlet 22. The housing 20 is designed to be detachably secured to the top of the housing 10 by any suitable means such as the stud screws 23. When the housing 20 is so arranged the outlet 22 in the housing 20 will be in line and communicate with the outlet 17 at the point 19, as shown in Fig. 2 and Fig. 4.

The numeral 24 designates a rubber washer resting on the ledge 13 and the numeral 25 designates a circular metal plate member provided with an inverted lip portion 26 about the underside of the periphery thereof and designed to snugly fit within the housing 10 with the lip ledge 26 resting on the rubber washer 24, as shown in Fig. 2. The plate 25 is provided with the centrally located irregular shaped opening 27.

A cylindrical filter housing 28 provided with a detachable bottom member 29 and cover member 30 is positioned within the chamber 11 and rests on the plate 25. The filter housing 28 is further provided with a plurality of spaced apart holes 31 in its side wall.

Peripheral flanges 32 and 33 are formed on the bottom 29 and cover 30 respectively, to frictionally engage the top and bottom rim portion of the filter housing 28, as shown in Fig. 4. This filter housing 28 is formed from a wide resilient metal band that has its free ends in spaced relation. When the base 29 and cover 30 are placed in their respective positions on the filter housing 28 the free ends of the housing are pushed together and the tendency of the band to expand thereby increases the frictional relation between the housing and the base and cover respectively.

The bottom 29 extends radially inwardly and upwardly to a center opening circumscribed by the upwardly extending circular collar flange 34. The cover 30 extends radially inwardly and downwardly to a centrally located opening circumscribed by the downwardly extending circular collar flange 35.

The numeral 36 designates a plurality of holes arranged near the periphery of the bottom 29 and inside and closely adjacent the flange 32. The numeral 37 designates a cylindrical shaped baffle member secured at one end to the inside of the cover 30 between and spaced apart from the flange 33 and flange 35 and extending vertically downwardly towards but short of the bottom member 29, as shown in Fig. 2.

The numeral 38 designates a cylindrical shaped mesh screen filter member that is vertically positioned within the filter housing 28 so that one end embraces the flange 34 on the bottom 29 and the other end embraces the flange 35 on the cover 30. A portion of the screen filter 38 is thus inside the baffle 37.

A second cylindrical shaped mesh screen filter member 39, larger in diameter than filter 38 is also vertically positioned within the filter housing 28 so that one end rests on the inside of the bottom 29 and the other end engages the inside of the cover 30. In this position the baffle 37 will be spaced apart and inside of the filter 39.

When the filter element is arranged and positioned as herein described there will be a space 40 in the chamber 11, between the inside of the housing 10 and the outside of the filter housing 28, as shown in Fig. 2 and Fig. 4.

The numeral 41 designates a valve stem having a reduced threaded upper portion 42, a conical shaped portion 49 on its lower portion, and a reduced lower stem portion 43. A valve head 44 on the bottom of the valve stem 41 is provided with a conical shaped valve top portion 45 and a resilient valve seat portion 46 on the bottom thereof.

In the top portion of the valve stem 41 an air passageway 47 extends transversely through the stem 41 and a vertical air passageway 48 extends from the top of the valve stem 41 to communicate with the passageway 47, as shown in Fig. 2.

The valve assembly is vertically slidably arranged within the housing 10 and the filter housing 28 so that the lower reduced stem portion 43 is slidable within the opening 27 in the plate 25 and the valve seat 46 is capable of closing the opening 14 at times. The conical portion 45 is designed to seat in the bottom of the opening 27 when the valve assembly is in an upwardly position as will be later described in detail.

The upper threaded portion 42 of the valve stem 41 is vertically slidable within the center opening in the cover 30.

The numeral 50 designates a metal washer on the upper portion of the valve stem 41 and on top of the cover 30. The numeral 51 designates a resilient diaphragm provided with a center opening to fit around the top of the valve stem 41 above the washer 50 and further designed to be secured in place between the housing 10 and the housing 20, as shown in Fig. 2. The diaphragm should be of a material through which air will not pass and therefore I preferably use rubber or like composition for this purpose.

A second metal washer 52, larger than the washer 50 is placed on the valve stem above the diaphragm 51.

The numeral 53 designates an elongated nut member threaded to the top of the valve stem 41 and serves to secure the washers 50 and 52 and the diaphragm to the valve stem 41, as shown in Fig. 2.

The top of the nut 53 is provided with an orifice 54 substantially the same size as the vertical air passageway 48 in the valve stem 41. The orifice 54 communicates with the passageway 48 and the chamber 21 in the housing 20.

The numeral 55 designates a nut gland member threaded into the center of the top of the housing 20, as shown in Fig. 2. The numeral 56 designates a valve stem rotatably arranged within the gland 55 and provided with the valve seat 57 that extends downwardly into the orifice 54 in the nut 53, as shown in Fig. 2. A fingertip grip member 58 is provided on the top of the valve stem 56 to facilitate the manual rotation thereof.

When this device is constructed and arranged as herein described it will operate in the following manner: It is first arranged in an air pressure line so that the inlet 15 is in communication with a source of air under pressure that is conducted through the hose or pipe or the like 16 and the outlet 17 is in communication with a hose, pipe or the like 18 that conducts the compressed air to a point of use, such as a paint spray gun, powered hand tools or the like. Thus, the compressed air will pass through my separator and filter before it reaches the point of use. Preferably, this device should be placed in the air line as close as possible to the point of use so that the air after leaving the separator will have no great distance to flow before being used and thereby reducing the possibility of additional moisture forming in the air line between the separator and point of use.

The position of the valve seat 46 in the chamber 12 when no air is flowing is illustrated in Fig. 2. The reason for this is that the air pressure within the chambers 11, 12 and 21 respectively is equal, and consequently the pressure on both sides of the diaphragm 51 is the same.

Air will enter through inlet 15 into the space 40. From the space 40 it will pass through the holes 31 in the filter housing 21, and thence through the larger mesh screen filter 39. After passing through the filter 39, the air will be directed downwardly by the baffle plate 37 and under this baffle to pass through the smaller mesh screen filter 38. As the air passes through the filter 38 it will be in position to be released through the passageways 47 and 48, as will later be described in detail.

The path of the air flow through the filter element just described will cause the moisture, sludge, grit, rust or the like to be separated and filtered therefrom and to collect on the inside of the bottom 29 of the filter housing 28. The bottom 29 slopes from the center opening therein downwardly to the periphery thereof where the holes 36 are located. These holes 36 provide an outlet path for the moisture from the bottom 29 in addition to the central opening in the bottom 29.

When air is released at the point of use the position of the valve seat 46 is illustrated in Fig. 4. As this air is released through the outlet 17, the pressure above the diaphragm 51 in the chamber 21 becomes less than the pressure below the diaphragm, thereby causing the valve assembly to travel to its upwardly position. As this occurs, the conical portion 45 on the valve head 44 will seat in the underside of the opening 27 in the metal plate 25. This will move the valve seat 46 off of the opening 14 in the housing 10 and will expose the chamber 12 to the atmosphere. When this occurs there will be a distinct snap or sharp report due to a momentary rush of air from the chamber 12 to the outside atmosphere because while the valve assembly is in its upwardly position the chamber 11 will be substantially sealed off from the chamber 12 by the seating of the conical portion 45 in the opening 27 so that the pressure in the chamber 12 will be reduced to substantially that of the atmosphere. In this initial rush of air from the chamber 12, moisture that has collected therein will be blown out through the opening 14.

The valve assembly will remain in its upwardly position as long as air is released at the point of use. The reason for this is that the air is continually entering the filter as described and passing out through the passageways 47 and 48 into the chamber 21 and thence through the outlet 22 into the outlet 17, and during this time the pressure above the diaphragm 51 will be sufficiently less than that below it to hold the valve assembly up.

When the release of air at the point of use is stopped, a momentarily high pressure, due to inertia, will be built up in the chamber 21. This pressure being above the diaphragm and considerably greater than the pressure below, it will blast the valve assembly downwardly to its lower position. As this occurs and during the time interval that it takes the valve seat 46 to be seated in the opening 14 the moisture or the like collected on the bottom 29 will be blown through the holes 36, the center opening of the bottom 29, thence through the opening 27 in the washer 25 and discharged through the opening 14. The distance of travel of the valve seat 46 is short but the concentrated pressure built up when the air flow is stopped is sufficient to produce the discharge just described.

In order to obtain a satisfactory discharge of moisture or the like when the air flow is stopped, as just described, it is essential that this device be positioned within a very few feet from the point of use. The reason for this is to insure the proper pressure in chamber 21 due to inertia when the flow of air at the point of use is stopped. If the point of use is too far from this device, pressure in the flow line will build up slowly when the air flow is stopped, and instead of the valve seat 46 being blown downwardly it will merely slowly flutter to its closed position. However, this will not impair the operation of my invention because when the air flow is again started, any moisture collected in this device will be blown out as previously described. But since this device is capable of discharging moisture both at the stopping and starting of the flow air, it is preferably located near the point of use to obtain the full advantages of which it is capable. Likewise, the location of this separator and filter close to the point of use serves the additional useful purpose, previously described, of reducing the possibility of moisture condensing in the air line between this device and the point of use.

After the valve seat 46 is seated the pressure within the separator will equalize and when air is again released at the point of use, the operation just described is repeated. After a prolonged operation, or for any other reason, if it is believed that all of the moisture has not been discharged, it is merely necessary to start and stop the flow of air one or more times and this will discharge any moisture or the like that might still be inside the device.

The hole 27 in the metal plate 25 is preferably formed irregularly as to its circumference, as shown in Fig. 3 so that when the conical portion 45 on the valve head 44 is seated in the same, there is not a complete seal. The purpose of this is to permit a bleeding or slight leakage of moisture through the hole 27 from the bottom 29 of the filter housing 28 during a prolonged use of any device attached at the point of use. In this way, if any undue amount of moisture is collecting in the bottom 29, it will be able to slowly bleed through the opening 27 into the chamber 12. At this point it will collect and to some extent drain out of the opening 14 since the pressure in the chamber 12 will be substantially that of the atmosphere. While constructing the hole 27, as shown in Fig. 3, to permit the bleeding described will also obviously permit some air to escape, it has been found that the loss of air in this way is too slight to interfere with the operation of the separator and filter or the device at the point of use. This slight loss of air, however, through the opening 27 during the flow of air to the point of use facilitates the discharge of the moisture that collects in chamber 12 during this time.

While I have shown the irregular shaped opening 27 in Fig. 3 to provide for the bleeding just described, experience has proven that the same result can be obtained by making the opening 27 round and providing a flat portion on the conical portion 45 of the valve head 44.

The valve assembly in the upper portion of this device is used to adjust this separator and filter for use when attachments at the point of use have orifices of varying diameters.

In the operation of this invention the existence of a proper difference in pressure at times above and below the diaphragm is essential. Consequently, when attachments at the point of use having different size orifices are used, it is necessary that a relative adjustment in an outlet orifice within the separator and filter be made. This adjustment I have provided by rotatably positioning the valve stem 56 within the nut gland 55 so that the valve seat 57 is vertically movable within the orifice 54 in the nut 53. In this position the valve seat 57 is of course also within the top portion of the passageway 48. The handle 58 makes it possible to manually rotate the valve stem 56 which lowers the valve seat 57 by clockwise rotation and raises it by counter-clockwise rotation. This rotation of the valve stem 56 will cause the valve seat 57 to enlarge or decrease the size of the orifice 54 as desired and thereby adjust the operation of this invention to different size orifices at the point of use, when necessary.

When this separator and filter is properly adjusted for use with an attachment at the point of use, there will be a sharp report or snap when the air flow is either started or stopped and the valve seat 46 is forced upwardly or downwardly as heretofore described. Upon changing the attachment at the point of use, it can be quickly determined if the orifice 54 is still in proper adjustment by merely starting and stopping the flow of air. When not in adjustment the sharp report will not be present but there may be a fluttering vibration of the lower valve assembly due to the improper difference in pressure above and below the diaphragm 51. If this occurs it is merely necessary to rotate the handle 58 and by re-starting and stopping the flow of air, the proper adjustment can be quickly determined and made.

In the event that repairs or replacement of parts becomes necessary this device is designed so that by removing the screws 23 the chamber 21 can be lifted off and thereby giving easy access to all parts of this separator and filter.

Some changes may be made in the construction and arrangement of my water separator and filter for air pressure line without departing from the real spirit and purpose of my invention, and it is my intention to cover by my claims, any modified forms of structure or use of mechanical equivalents which may be reasonably included within their scope.

I claim:

1. In a device of the class described, a housing having an air inlet opening, an air outlet opening and a water outlet opening, a flexible wall inside said housing dividing said housing into two compartments one of which communicates with said air inlet opening and the other with said air outlet opening, a pressure differential operated valve in said housing secured to and extending through said flexible wall capable of closing said water outlet opening at times, an air passageway in said valve having one end communicating with one compartment and its other end communicating with the other said compartment, and an adjustable valve means in said air passageway in said first mentioned valve.

2. In a device of the class described, a housing having an air inlet opening, an air outlet opening and a water outlet opening, a plate member arranged within said housing to divide said housing into compartments; said plate provided with a central opening to permit communication between said compartments, a pressure differential operated valve in said housing capable of closing said water outlet opening at times and designed to substantially but not completely close the communication between said compartments at times, and a manually operated valve for adjustably regulating the air pressure differential in said housing.

3. In a device of the class described, a housing having an air inlet opening, an air outlet opening and a water outlet opening, a flexible wall inside said housing dividing said housing into an upper and lower compartment one of which communicates with said air inlet opening and the other with said air outlet opening, a plate member provided with a central opening, arranged in said lower compartment to form two chambers and permitting communication between said chambers, a pressure differential operated valve in said housing secured to and extending through said flexible wall and plate and capable of closing said water outlet opening at times, and designed to substantially but not completely close the communication between said chambers at times, an air passageway in said valve having one end communicating with one compartment and its other end communicating with the other said compartment, and an adjustable valve means in said air passageway in said first mentioned valve.

4. In a device of the class described, a housing having a detachable lid cover, an air inlet opening, an air outlet opening and a water outlet opening provided in said housing, a flexible wall inside said housing intermediate said cover and said housing to form an upper and lower compartment therein; said lower compartment in communication with said air inlet opening and said upper compartment in communication with said air outlet opening, a filter means arranged within said lower compartment intermediate said air inlet opening and said air outlet opening, a plate member arranged in said lower compartment to form an upper and lower chamber therein; said plate member provided with an opening to permit communication between said chambers, a pressure differential operated valve secured to and extending through said flexible wall and through said filter means and plate and extending through said lower compartment and into said upper compartment and into said lower chamber; said valve capable of closing said water outlet at times and designed to substantially but not completely close the communication between said chambers at times, an air passageway in said valve having one end in communication with one compartment and its other end in communication with the other said compartment, and an adjustable valve means in said air passageway in said first mentioned valve.

5. In a device of the class described, a housing having an air inlet opening, an air outlet opening and a water outlet opening, a flexible wall inside said housing dividing said housing into two compartments one of which communicates with said air inlet opening and the other with said air outlet opening, a pressure differential operated valve in said housing secured to and extending through said flexible wall capable of closing said water outlet opening at times, an air passageway in said valve having one end communicating with said inlet opening and its other end in communication with said outlet opening, and an adjustable valve means in said air passageway designed to regulate the air pressure in said outlet opening.

6. In a device of the class described, a housing having a detachable lid cover, an air inlet opening, an air outlet opening and a water outlet opening provided in said housing, a flexible wall inside said housing intermediate said cover and said housing to form an upper and lower compartment therein; said lower compartment in communication with said air inlet opening and said upper compartment in communication with said air outlet opening, a filter means arranged within said lower compartment intermediate said air inlet opening and said air outlet opening, a plate member arranged in said lower compartment to form an upper and lower chamber therein; said plate member provided with an opening to permit communication between said chambers, a pressure differential operated valve secured to and extending through said flexible wall and through said filter means and plate and extending through said lower compartment and into said upper compartment and into said lower chamber; said valve capable of closing said water outlet at times and designed to substantially but not completely close the communication between said chambers at times, an air passageway in said valve having one end in communication with said inlet opening and its other end in communication with said outlet opening, and an adjustable valve means in said air passageway designed to regulate the air pressure in said outlet opening.

7. In a device of the class described, a housing having an air inlet opening, an air outlet opening and a water outlet opening, a flexible wall inside said housing dividing said housing into a first and second compartment respectively, said first compartment communicating with said air inlet opening and the second with said air outlet opening, a pressure differential operated valve in said housing secured to and extending through said flexible wall capable of closing said water outlet opening at times, an air passageway in said valve having one end communicating with one compartment and its other end communicating with the other said compartment, and an adjustable valve means in said air passageway designed to regulate the air pressure in said first compartment.

PAUL B. SHAW.

References Cited in the file of this patent

UNITED STATES PATENTS

| Number | Name | Date |
|--------|------|------|
| 548,458 | Reynolds | Oct. 22, 1895 |
| 1,450,561 | Parker | Apr. 3, 1923 |
| 1,691,350 | Harris | Nov. 13, 1928 |
| 2,058,189 | Stuard | Oct. 20, 1936 |